(12) United States Patent
Parusel et al.

(10) Patent No.: US 7,629,041 B2
(45) Date of Patent: *Dec. 8, 2009

(54) DIFFUSER DISK FOR LCD APPLICATIONS, METHOD FOR THE PRODUCTION AND USE THEREOF

(75) Inventors: Markus Parusel, Messel (DE); Jann Schmidt, Rockaway, NJ (US); Herbert Groothues, Weiterstadt (DE)

(73) Assignee: Evonik Roehm GmbH, Darmstadt (DE)

( * ) Notice: Subject to any disclaimer, the term of this patent is extended or adjusted under 35 U.S.C. 154(b) by 360 days.

This patent is subject to a terminal disclaimer.

(21) Appl. No.: 10/566,249

(22) PCT Filed: May 12, 2004

(86) PCT No.: PCT/EP2004/005058

§ 371 (c)(1),
(2), (4) Date: Jan. 30, 2006

(87) PCT Pub. No.: WO2005/022245

PCT Pub. Date: Mar. 10, 2005

(65) Prior Publication Data

US 2006/0240200 A1   Oct. 26, 2006

(30) Foreign Application Priority Data

Aug. 4, 2003   (DE) ............................... 103 36 130

(51) Int. Cl.
*B32B 19/00* (2006.01)
*G02B 5/00* (2006.01)

(52) U.S. Cl. ................. 428/220; 428/323; 428/327; 428/330; 428/500; 359/443; 359/448; 359/460; 359/601; 525/305; 156/244.11

(58) Field of Classification Search ....................... None
See application file for complete search history.

(56) References Cited

U.S. PATENT DOCUMENTS

| | | | | |
|---|---|---|---|---|
| 5,004,785 | A * | 4/1991 | Ida et al. ..................... | 525/305 |
| 5,237,004 | A * | 8/1993 | Wu et al. ..................... | 525/85 |
| 6,268,961 | B1 * | 7/2001 | Nevitt et al. ................. | 359/488 |
| 6,346,311 | B1 * | 2/2002 | Yeo et al. .................... | 428/143 |
| 6,602,596 | B2 * | 8/2003 | Kimura et al. ............... | 428/327 |
| 2002/0009573 | A1 | 1/2002 | Kimura et al. | |
| 2002/0123565 | A1 * | 9/2002 | Schultes et al. .............. | 525/50 |
| 2004/0033427 | A1 * | 2/2004 | Coveleskie et al. .......... | 430/30 |
| 2004/0257650 | A1 | 12/2004 | Parusel et al. | |
| 2005/0084993 | A1 | 4/2005 | Schmidt et al. | |

FOREIGN PATENT DOCUMENTS

| | | |
|---|---|---|
| DE | 43 27 464 | 2/1995 |
| EP | 0 269 324 | 6/1988 |
| EP | 0 342 283 | 11/1989 |
| EP | 0 561 551 | 9/1993 |
| EP | 561551 A1 * | 9/1993 |
| EP | 1 116 741 | 7/2001 |
| JP | 63-77940 | 4/1988 |
| JP | 4-134440 | 5/1992 |
| JP | 5-051480 | 3/1993 |
| JP | 8-198976 | 8/1996 |
| JP | 2000-296580 | 10/2000 |
| WO | WO 03042290 A1 * | 5/2003 |

OTHER PUBLICATIONS

Plastic Material Data Sheets. Kipp, Dale O. (2004). Plastic Material Data Sheets. MatWeb—Division of Automation Creation, Inc. (http://knovel.com/web/portal/browse/display?_EXT_KNOVEL_DISPLAY_bookid=1023&VerticalID=0).*

* cited by examiner

*Primary Examiner*—David R Sample
*Assistant Examiner*—April C Inyard
(74) *Attorney, Agent, or Firm*—Oblon, Spivak, McClelland, Maier & Neustadt, L.L.P.

(57) ABSTRACT

The present invention relates to diffuser sheets for LCD applications encompassing at least one light-scattering polymethyl methacrylate layer which comprises a polymethyl methacrylate matrix and also from 0.5 to 59.5% by weight, based on the weight of the light-scattering polymethyl methacrylate layer, of spherical scattering particles (A) whose median size $V_{50}$ is in the range from 0.1 to 40 μm, and whose refractive index differs from that of the polymethyl methacrylate matrix by a value in the range from 0.02 to 0.2, and from 0.5 to 59.5% by weight, based on the weight of the light-scattering polymethyl methacrylate layer, of spherical particles (B) whose median size $V_{50}$ is in the range from 10 to 150 μm and whose refractive index differs from that of the polymethyl methacrylate matrix by a value in the range from 0 to 0.2, where the total concentration of the spherical scattering particles (A) and particles (B) is in the range from 1 to 60% by weight, based on the weight of the light-scattering polymethyl methacrylate layer, and the spherical scattering particles (A) and spherical particles (B) have a different median particle size $V_{50}$, where the transmittance of the diffuser sheets is in the range from 20 to 70% and their scattering power is greater than 0.3, where the ratio of the square of average surface roughness of the polymethyl methacrylate layer $R_Z$ to the third power of the size of the spherical particles (B) $R_Z^2/D_{PB}^3$ is in the range from 0.0002 to 0.1300 μm$^{-1}$.

27 Claims, No Drawings

DIFFUSER DISK FOR LCD APPLICATIONS, METHOD FOR THE PRODUCTION AND USE THEREOF

The present invention relates to diffuser sheets for LCD applications encompassing at least one light-scattering polymethyl methacrylate layer, to processes for the production of these diffuser sheets, and to use.

Monitors based on liquid-crystal technology have been known for some time. These LCDs (liquid crystal displays) are often used as a display medium on computers. Relatively recent times have seen the start of supply of this technology in television devices, too. LCDs are also used for the graphics presenting navigation data in automobiles, aircraft and ships. A wide variety of requirements are therefore placed upon these monitors. A common feature of many LCDs is an illumination unit, attached behind the actual LCD cell with the polarization films. Between the illumination unit and the LCD cell, use is often made of diffuser sheets which distribute the light needed for the display uniformly across the LCD cell.

Sheets suitable for this purpose and encompassing mixtures of particles are known per se. For example, the publication JP 4-134440 describes rear-projection screens which will encompass particles with different refractive index. This gives better colour-shade reproduction.

Furthermore, JP 8-198976, JP 5-51480 and JP 2000-296580, by way of example, describe sheets of this type which can be used for optical applications.

The abovementioned sheets which comprise scattering media may in principle be used as a diffuser sheet. However, known sheets do not have a balanced property profile.

For example, the brightness distribution achieved by known sheets provided with scattering media is often not ideal.

Many sheets moreover have a relatively high yellowness index, which can cause colour distortion. In addition, many diffuser sheets have excessively high or excessively low transmittance, and excessive haze.

Furthermore, many known impact-modified diffuser sheets have temperature-dependent optical properties, such as scattering power or halved-intensity angle or yellowness index. The temperature dependency may possibly be insignificant in some applications. However, in this context consideration has to be given to the fact that the dashboards of automobiles are subject to severe temperature variations. High temperatures therefore produce, inter alia, measurable inhomogeneity. The diffuser sheet should provide maximum uniformity of properties despite these severe variations.

Many diffuser sheets are moreover highly susceptible to scratching. After installation this property may possibly appear relatively insignificant. However, increased preventive measures have to be taken during the assembly of the visual display screens in order to eliminate scratches. Visible scratches result in inhomogeneity in the light diffused over the LCD cell.

In the light of the prior art stated and discussed herein, it was therefore an object of the present invention to provide diffuser sheets for LCD applications which can give a particularly balanced property profile. The diffuser sheets should in particular permit high luminous efficiency together with a very high level of scattering action.

The diffuser sheets should moreover be capable of producing a scattered light which is particularly neutral, with no colour shift. The colours produced here by the LCD cells should undergo only slight change as a result of temperature variations.

Another object of the present invention consisted in providing diffuser sheets for LCD applications which have particularly uniform brightness distribution.

The diffuser sheets should moreover have maximum mechanical stability. Scratches on the plastics sheet here should be invisible or only slightly visible. In particular, damage should have no, or only slight, effect on the brightness distribution of the monitor provided with a diffuser sheet.

Another object on which the invention was based was to provide diffuser sheets for LCD applications which are capable of particularly simple production. The diffuser sheets should in particular therefore be capable of production by extrusion.

Another object of the present invention was to provide diffuser sheets whose property profile is only slightly temperature-sensitive. The result is to provide LCDs which can be used in automobiles, for example.

Another object of the present invention consisted in providing diffuser sheets whose size and shape can easily be adapted to requirements. It should therefore be possible to use very inexpensive processes, such as laser cutting systems, for operations on the diffuser sheets.

Another object of the invention consisted in providing diffuser sheets with high durability, in particular high resistance to UV radiation or weathering.

The diffuser sheets described in Claim 1 achieve these objects, and also achieve other objects which, although they are not specifically mentioned, are obvious or necessary consequences of the circumstances discussed herein. Useful modifications of the inventive diffuser sheets are protected by the subclaims dependent on Claim 1.

Claim 24 achieves the underlying object with respect to the processes for producing diffuser sheets.

Surprisingly, diffuser sheets for LCD applications encompassing at least one light-scattering polymethyl methacrylate layer which comprises a polymethyl methacrylate matrix and also from 0.5 to 59.5% by weight, based on the weight of the light-scattering polymethyl methacrylate layer, of spherical scattering particles (A) whose median size $V_{50}$ is in the range from 0.1 to 40 μm, and whose refractive index differs from that of the polymethyl methacrylate matrix by a value in the range from 0.02 to 0.2, and from 0.5 to 59.5% by weight, based on the weight of the light-scattering polymethyl methacrylate layer, of spherical particles (B) whose median size $V_{50}$ is in the range from 10 to 150 μm and whose refractive index differs from that of the polymethyl methacrylate matrix by a value in the range from 0 to 0.2, where the total concentration of the spherical scattering particles (A) and particles (B) is in the range from 1 to 60% by weight, based on the weight of the light-scattering polymethyl methacrylate layer, and the spherical scattering particles (A) and spherical particles (B) have a different median particle size $V_{50}$, where the transmittance of the diffuser sheet is in the range from 20 to 70% and its scattering power is greater than 0.2, and having a very good, balanced property profile can be provided if the ratio of the square of average surface roughness of the polymethyl methacrylate layer $R_Z$ to the third power of the size of the spherical particles (B) $R_Z^2/D_{PB}^3$ is in the range from 0.0002 to 0.1300 μm$^{-1}$.

The following particular advantages, inter alia, are achieved by the inventive measures:

The diffuser sheets of the present invention may be adapted to individual requirements without any resultant impairment of brightness distribution and/or susceptibility to scratching.

The diffuser sheets of the present invention can give high transmittance and good scattering power.

The image reproduction on the inventive diffuser sheets can give LCDs which deliver an image with particular colour accuracy.

The diffuser sheets provided according to the present invention have particularly uniform brightness distribution.

The diffuser sheets of the present invention moreover have high mechanical stability. Scratches which may be present here on the sheet have no, or only slight, effect on the image produced by the LCD cell.

The diffuser sheets of the present invention may moreover also be used in LCDs which are exposed to a particularly high level of temperature variation. These temperature variations have only slight effect on the brightness distribution, the transmittance or the scattering power of the diffuser sheets.

The diffuser sheets of the present invention can moreover be produced in a particularly simple manner. The diffuser sheets can in particular be produced by extrusion.

The inventive diffuser sheets have high resistance to weathering, in particular to UV irradiation.

The size and shape of the diffuser sheets can be adapted to requirements.

The light-scattering polymethyl methacrylate layer of the diffuser sheet according to the present invention comprises from 1 to 60% by weight, in particular from 3 to 55% by weight and preferably from 6 to 48% by weight, based on the weight of the light-scattering polymethyl methacrylate layer, of spherical scattering particles (A) and spherical particles (B).

The scattering particles (A) and the particles (B) are spherical. For the purposes of the present invention, the term spherical means that the particles preferably have a spherical shape, but it is clear to the person skilled in the art that, as a consequence of the methods of production, it is also possible that particles with some other shape may be present, or that the shape of the particles may deviate from the ideal spherical shape.

The term spherical therefore means that the ratio of the largest dimension of the particles to the smallest dimension is not more than 4, preferably not more than 2, each of these dimensions being measured through the centre of gravity of the particles. At least 70% of the particles are preferably spherical, particularly preferably at least 90%, based on the number of particles.

The median size $V_{50}$ of the scattering particles (A) is in the range from 0.1 to 40 μm, in particular from 0.5 to 30 μm and particularly preferably from 1 to 15 μm.

The light-scattering PMMA layer encompasses from 0.5 to 59.5% by weight, preferably from 1 to 20% by weight and particularly preferably from 1.5 to 10% by weight of spherical scattering particles (A), based on the weight of the light-scattering polymethyl methacrylate layer.

Particles of this type are known per se and can be obtained commercially. Among these are in particular plastics particles, and also particles which encompass inorganic materials.

There is no particular restriction on the scattering particles which may be used according to the invention, but refraction of light takes place at the phase boundary between the scattering particles (A) and the matrix plastic.

When the refractive index of the scattering particles (A) is measured, the refractive index no measured for the sodium D line (589 nm) at 20° C. differs from the refractive index no of the matrix plastic by from 0.02 to 0.2 units.

The spherical scattering particles (A) preferably encompass crosslinked polystyrene, polysilicone and/or crosslinked poly(meth)acrylates.

One group of preferred plastics particles which are used as scattering agents comprises silicones. By way of example, particles of this type are obtained by hydrolysis and polycondensation of organotrialkoxysilanes and/or of tetraalkoxysilanes, these being described by the formulae

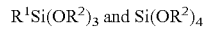

$R^1Si(OR^2)_3$ and $Si(OR^2)_4$ where $R^1$ is, by way of example, a substituted or unsubstituted alkyl group, an alkenyl group or a phenyl group, and the radical $R^2$ of the hydrolyzable alkoxy group is an alkyl group, such as methyl, ethyl or butyl, or an alkoxy-substituted hydrocarbon group, such as 2-methoxyethyl or 2-ethoxyethyl. Examples of organotrialkoxysilanes are methyltrimethoxysilane, methyltriethoxysilane, methyl-n-propoxysilane, methyltriisopropoxysilane and methyltris(2-methoxyethoxy)silane.

The abovementioned silane compounds, and processes for the production of spherical silicone particles, are known to those skilled in the art and are described in the specifications EP 1 116 741, JP 63-077940 and JP 2000-186148.

Scattering agents composed of silicone and particularly preferably used in the present invention are obtainable from GE Bayer Silicones with the tradenames TOSPEARL® 120 and TOSPEARL® 3120.

The structure of another group of preferred plastics particles comprises:

b1) from 25 to 99.9 parts by weight of monomers which have aromatic groups as substituents, for example styrene, α-methylstyrene, ring-substituted styrenes, phenyl (meth)acrylate, benzyl (meth)acrylate, 2-phenylethyl (meth)acrylate, 3-phenylpropyl (meth)acrylate or vinyl benzoate; and also b2) from 0 to 60 parts by weight of an acrylic and/or methacrylic ester having 1 to 12 carbon atoms in the aliphatic ester radical, these being copolymerizable with the monomers b1), and mention may be made here of the following by way of example: methyl (meth)acrylate, ethyl (meth)acrylate, n-propyl (meth)acrylate, isopropyl (meth)acrylate, n-butyl (meth)acrylate, isobutyl (meth)acrylate, tert-butyl (meth)acrylate, cyclohexyl (meth)acrylate, 3,3,5-trimethylcyclohexyl (meth)acrylate, 2-ethylhexyl(meth)acrylate, norbornyl (meth)acrylate or isobornyl (meth)acrylate;

b3) from 0.1 to 15 parts by weight of crosslinking comonomers which have at least two ethylenically unsaturated groups copolymerizable by a free-radical route with b1) and, where appropriate, with b2), examples being divinylbenzene, glycol di(meth)acrylate, 1,4-butanediol di(meth)acrylate, allyl (meth)acrylate, triallyl cyanurate, diallyl phthalate, diallyl succinate, pentaerythritol tetra(meth)acrylate or trimethylolpropane tri(meth)acrylate, where the amounts of the comonomers b1), b2) and b3) give a total of 100 parts by weight.

Mixtures from which the plastics particles are produced particularly preferably comprise at least 80% by weight of styrene and at least 0.5% by weight of divinylbenzene.

The production of crosslinked plastics particles is known to those skilled in the art. For example, the scattering particles may be produced by emulsion polymerization, for example as described in EP-A 342 283 or EP-A 269 324, and very particularly preferably via organic-phase polymerization, for example as described in the German Patent Application P 43 27 464.1. The last-mentioned polymerization technique gives particularly narrow particle size distributions or, in other words, particularly small deviations of the particle diameters from the average particle diameter.

It is particularly preferable to use plastics particles whose heat resistance extends to at least 200° C., in particular at least 250° C., with no intended resultant restriction. The term heat-resistant here means that the particles are not subject to any substantial thermal degradation. Thermal degradation causes undesirable discoloration making the plastics material unusable.

Particularly preferred particles are, inter alia, obtainable from Sekisui with the trade names ®Techpolymer SBX-6, ®Techpolymer SBX-8 and ®Techpolymer SBX-12.

Among the inorganic materials from which the scattering particles (A) may likewise be produced are aluminium hydroxide, aluminium potassium silicate (mica), aluminium silicate (kaolin), barium sulphate ($BaSO_4$), calcium carbonate, magnesium silicate (talc). Among these materials, preference is given to $BaSO_4$.

Among the abovementioned scattering particles, preference is given to particles which encompass inorganic materials.

The scattering particles (A) described above may be used individually or in the form of a mixture of two or more types.

The light-scattering PMMA layer encompasses from 0.5 to 59.5% by weight, preferably from 5 to 40% by weight and particularly preferably from 8 to 25% by weight, of spherical particles (B), based on the weight of the light-scattering polymethyl methacrylate layer.

The particles (B) to be used according to the invention have a median size $V_{50}$ in the range from 10 to 150 µm, preferably from 15 to 70 µm and particularly preferably from 30 to 50 µm. When the refractive index of the particles is measured, the refractive index $n_0$ measured for the sodium D line (589 nm) at 20° C. differs from the refractive index $n_0$ of the matrix plastic by from 0 to 0.2 units.

The particles (B) may likewise be obtained commercially. The materials from which these particles are produced may be the same as those from which the scattering particles (A) are produced. Preference is given here to the use of plastics particles.

The spherical particles (B) preferably encompass crosslinked polystyrene, polysilicone and/or crosslinked poly(meth)acrylates.

The particles (B) described above may be used individually or in the form of a mixture of two or more types.

The ratio of the ponderal median of the scattering particles (A) in relation to the particles (B) is preferably in the range from 1:100 to 10:1, in particular from 1:50 to 7.5:1, particularly preferably from 1:25 to 5:1 and very particularly preferably from 1:10 to 3:1.

The difference between the median size $V_{50}$ of the scattering particles (A) and of the particles (B) is preferably at least 5 µm, in particular at least 10 µm, the particles (B) being larger than the scattering particles (A).

Laser extinction method may be used to determine the particle size, and also the particle size distribution. Use may be made here of a Galay-CIS from L.O.T. GmbH, the test method for determining particle size, and also particle size distribution, being given in the user manual.

An X-ray sedigraph may be used to determine the size of inorganic particles. A MICROSCAN II device from Qantachrome may be used for this purpose. The MICROSCAN II is an automatic test device for determining the particle size distribution of powders in suspensions with a measurement range from 0.1 to 300 µm. The measurement principle of the MICROSCAN II is sedimentation with X-ray detection. For this, the particles are dispersed homogeneously in a liquid with the aid of an incorporated hose pump or ultrasound treatment. Particle size is determined by the Stokes law as a function of the density of particle and dispersion liquid, the viscosity of the liquid, and the velocity at which the particles sink.

The median particle size, $V_{50}$, is the ponderal median, where the value for 50% by weight of the particles is smaller than or identical with this value and that for 50% by weight of these particles is greater than or identical with this value.

According to one particular aspect of the present invention, these particles have uniform distribution within the plastics matrix, with no significant aggregation or agglomeration of the particles. Uniform distribution means that the concentration of particles within the plastics matrix is in essence constant.

The light-scattering layer encompasses, alongside the spherical particles, a plastics matrix which comprises polymethyl methacrylate (PMMA). The light-scattering polymethyl methacrylate layer preferably encompasses at least 30% by weight, and in particular at least 40% by weight, and particularly preferably at least 50% by weight, of polymethyl methacrylate, based on the weight of the light-scattering layer.

Polymethyl methacrylates are generally obtained via free-radical polymerization of mixtures which comprise methyl methacrylate. These mixtures generally comprise at least 40% by weight, preferably at least 60% by weight, and particularly preferably at least 80% by weight, of methyl methacrylate, based on the weight of the monomers.

Alongside this, these mixtures for preparing polymethyl methacrylates may comprise other (meth)acrylates which are copolymerizable with methyl methacrylate. The term (meth)acrylates encompasses methacrylates and acrylates, and also mixtures of the two.

These monomers are well known. They include (meth)acrylates derived from saturated alcohols, for example methyl acrylate, ethyl (meth)acrylate, propyl (meth)acrylate, n-butyl (meth)acrylate, tert-butyl (meth)acrylate, pentyl (meth)acrylate and 2-ethylhexyl (meth)acrylate;

(meth)acrylates derived from unsaturated alcohols, for example oleyl (meth)acrylate, 2-propynyl (meth)acrylate, allyl (meth)acrylate, vinyl (meth)acrylate; aryl (meth)acrylates, such as benzyl (meth)acrylate or phenyl(meth)acrylate, where in each case the aryl radicals may be unsubstituted or have up to four substituents;

cycloalkyl (meth)acrylates, such as 3-vinylcyclohexyl (meth)acrylate, bornyl (meth)acrylate;

hydroxyalkyl (meth)acrylates, such as 3-hydroxypropyl (meth)acrylate, 3,4-dihydroxybutyl (meth)acrylate, 2-hydroxyethyl (meth)acrylate, 2-hydroxypropyl (meth)acrylate;

glycol di(meth)acrylates, such as 1,4-butanediol (meth)acrylate, (meth)acrylates of ether alcohols, for example tetrahydrofurfuryl(meth)acrylate, vinyloxyethoxyethyl (meth)acrylate;

amides and nitriles of (meth)acrylic acid, for example N-(3-dimethylaminopropyl)(meth)acrylamide, N-(diethylphosphono)(meth)acrylamide, 1-methacryloylamido-2-methyl-2-propanol;

sulphur-containing methacrylates, such as ethyl-sulphinylethyl (meth)acrylate, 4-thiocyanatobutyl (meth)acrylate, ethylsulphonylethyl (meth)acrylate, thiocyanatomethyl (meth) acrylate, methylsulphinylmethyl (meth)acrylate, bis((meth) acryloyloxyethyl) sulphide;

polyfunctional (meth)acrylates, such as trimethyloyl-propane tri(meth)acrylate.

Besides the abovementioned (meth)acrylates, the compositions to be polymerized may also comprise other unsaturated monomers copolymerizable with methyl methacrylate and the abovementioned (meth)acrylates.

They include 1-alkenes, such as 1-hexene, 1-heptene; branched alkenes, such as vinylcyclohexane, 3,3-dimethyl-1-propene, 3-methyl-1-diisobutylene, 4-methyl-1-pentene;

acrylonitrile; vinyl esters, such as vinyl acetate;

styrene, substituted styrenes having an alkyl substituent in the side chain, e.g. α-methylstyrene and α-ethylstyrene, substituted styrenes having an alkyl substituent on the ring, such as vinyltoluene and p-methylstyrene, halogenated styrenes, such as mono-chlorostyrenes, dichlorostyrenes, tribromostyrenes and tetrabromostyrenes;

heterocyclic vinyl compounds, such as 2-vinylpyridine, 3-vinylpyridine, 2-methyl-5-vinylpyridine, 3-ethyl-4-vinylpyridine, 2,3-dimethyl-5-vinylpyridine, vinylpyrimidine, vinylpiperidine, 9-vinylcarbazole, 3-vinylcarbazole, 4-vinylcarbazole, 1-vinylimidazole, 2-methyl-1-vinylimidazole, N-vinylpyrrolidone, 2-vinylpyrrolidone, N-vinylpyrrolidine, 3-vinylpyrrolidine, N-vinylcaprolactam, N-vinylbutyrolactam, vinyloxolane, vinylfuran, vinylthiophene, vinylthiolane, vinylthiazoles and hydrogenated vinylthiazoles, vinyloxazoles and hydrogenated vinyloxazoles;

vinyl and isoprenyl ethers;

maleic acid derivatives, such as maleic anhydride, methylmaleic anhydride, maleimide, methylmaleimide; and dienes, such as divinylbenzene.

The amount generally used of these comonomers is from 0 to 60% by weight, preferably from 0 to 40% by weight, and particularly preferably from 0 to 20% by weight, based on the weight of the monomers, and these compounds may be used individually or in the form of a mixture.

The polymerization is generally initiated using known free-radical initiators. Among the preferred initiators are, inter alia, the azo initiators well-known to the person skilled in the art, for example AIBN and 1,1-azobiscyclohexanecarbonitrile, and also peroxy compounds, such as methyl ethyl ketone peroxide, acetylacetone peroxide, dilauryl peroxide, tert-butyl per-2-ethylhexanoate, ketone peroxide, methyl isobutyl ketone peroxide, cyclohexanone peroxide, dibenzoyl peroxide, tert-butyl peroxybenzoate, tert-butylperoxy isopropyl carbonate, 2,5-bis(2-ethylhexanoylperoxy)-2,5-dimethylhexane, tert-butyl 2-ethylperoxyhexanoate, tert-butyl 3,5,5-trimethylperoxyhexanoate, dicumyl peroxide, 1,1-bis(tert-butylperoxy)cyclohexane, 1,1-bis(tert-butylperoxy)-3,3,5-trimethylcyclohexane, cumyl hydroperoxide, tert-butyl hydroperoxide, bis(4-tert-butylcyclohexyl) peroxydicarbonate, mixtures of two or more of the abovementioned compounds with one another, and also mixtures of the abovementioned compounds with compounds not mentioned but likewise capable of forming free radicals.

The amount often used of these compounds is from 0.01 to 10% by weight, preferably from 0.5 to 3% by weight, based on the weight of the monomers.

Use may be made here of various poly(meth)acrylates which differ, for example in their molecular weight or in their monomeric constitution.

The matrix of the light-scattering layer may moreover comprise other polymers in order to modify its properties. Among these are, inter alia, polyacrylonitrites, polystyrenes, polyethers, polyesters, polycarbonates and polyvinyl chlorides. These polymers may be used individually or in the form of a mixture, and it is also possible here to use copolymers which are derivable from the abovementioned polymers.

The weight-average molar mass $M_w$ of the homo- and/or copolymers to be used according to the invention as the matrix polymer may vary within a wide range, the molar mass usually being matched to the intended use and to the mode of processing of the moulding composition. However, it is generally in the range from 20 000 to 1 000 000 g/mol, preferably from 50 000 to 500 000 g/mol and particularly preferably from 80 000 to 300 000 g/mol, with no intended resultant restriction.

In one particular embodiment of the present invention, the matrix of the light-scattering polymethyl methacrylate layer has at least 70% by weight, preferably at least 80% by weight, and particularly preferably at least 90% by weight, of polymethyl methacrylate, based on the weight of the matrix of the light-scattering layer.

In one particular aspect of the present invention, the poly (meth)acrylates of the matrix of the light-scattering layer have a refractive index in the range from 1.46 to 1.54, measured for the sodium D line (589 nm) and at 20° C.

The moulding compositions for preparing the light-scattering layer may comprise conventional additives of any type. Among these are antistatic agents, antioxidants, mould-release agents, flame retardants, lubricants, dyes, flow improvers, fillers, light stabilizers, UV absorbers and organophosphorus compounds, such as phosphites or phosphonates, pigments, weathering stabilizers and plasticizers. However, the amount of additives is restricted in relation to the intended use. For example, the light-scattering property of the polymethyl methacrylate layer should not be excessively impaired by additives, nor should its transparency. In particular, the amounts added of additives whose optical properties are temperature-dependent should be only very small. The amount present in the diffuser sheet of impact modifiers described by way of example in EP-A 0 113 924, EP-A 0 522 351, EP-A 0 465 049 and EP-A 0 683 028 should therefore be only very small. The content of impact modifiers in the diffuser sheets is preferably restricted to a maximum of 20% by weight, preferably 10% by weight and particularly preferably from 4% by weight. According to one particular aspect of the present invention, diffuser sheets of the present invention particularly preferably encompass no impact modifiers.

Particularly preferred moulding compositions for producing the plastics matrix are obtainable commercially from Röhm GmbH & Co. KG.

The thickness of the light-scattering polymethyl methacrylate layer is generally in the range from 1 to 100 mm, preferably in the range from 1 to 10 mm and particularly preferably in the range from 2 to 5 mm.

According to one particular aspect of the present invention, the concentration of the spherical scattering particles (A) $c_{PA}$, the thickness of the light-scattering polymethyl methacrylate layer $d_S$, and the size of the spherical scattering particles (A) $D_{PA}$ is selected in such a way that the ratio of the product of concentration of the spherical scattering particles (A) $c_{PA}$ and thickness of the light-scattering polymethyl methacrylate layer to the third power of the size of the spherical scattering particles (A) $c_{PA}*d_S/D_{PA}^3$ is preferably in the range from 0.0001 to 0.5% by weight*mm/μm³, in particular from 0.0025 to 0.3% by weight*mm/μm³.

If the scattering media used comprise plastics particles whose size $V_{50}$ is in the range from 6 to 30 μm, according to one particular aspect of the present invention, the ratio of the product of concentration of the spherical scattering particles (A) $c_{PA}$ and thickness of the light-scattering polymethyl methacrylate layer to the third power of the size of the spherical scattering particles (A) $c_{PA}*d_S/D_{PA}^3$ is preferably in the range from 0.0015 to 0.09% by weight*mm/μm³, particularly preferably from 0.0025 to 0.06% by weight*mm/μm³ and very particularly preferably in the range from 0.005 to 0.04% by weight*mm/μm³.

If the scattering media used comprise inorganic particles whose size $V_{50}$ is in the range from 0.1 to 5 μm then according to one particular aspect of the present invention the ratio of the product of concentration of the spherical scattering particles (A) $c_{PA}$ and thickness of the light-scattering polymethyl methacrylate layer to the third power of the size of the spherical scattering particles (A) $c_{PA}*d_S/D_{PA}^3$ is preferably in the range from 0.015 to 0.5% by weight*mm/μm³, in particular from 0.025 to 0.3% by weight*mm/μm³.

The concentration of the spherical particles (B) $c_{PB}$, the thickness of the light-scattering polymethyl methacrylate layer $d_S$ and the size of the spherical particles (B) $D_{PB}$ may be selected in such a way that the ratio of the product of concentration of the spherical scattering particles (B) $c_{PB}$ and thickness of the light-scattering polymethyl methacrylate layer to the third power of the size of the spherical scattering particles (B) $c_{PB}*d_S/D_{PB}^3$ is preferably in the range from 0.000005 to 0.04% by weight*mm/μm³, in particular from 0.00005 to 0.02% by weight*mm/μm³.

The ratio of the square of average surface roughness of the polymethyl methacrylate layer $R_Z$ to the third power of the size of the spherical particles (B) $R_Z^2/D_{PB}^3$ may preferably be in the range from 0.0002 μm⁻¹ to 0.1300 μm⁻¹, preferably from 0.0009 μm⁻¹ to 0.0900 μm⁻¹, in particular from 0.0006 μm⁻¹ to 0.0800 μm⁻¹ and preferably from 0.0008 μm⁻¹ to 0.0400 μm⁻¹.

According to one particular embodiment of the sheet of the present invention, the ratio of concentration of the spherical scattering particles (A) $c_{PA}$ to the thickness of the light-scattering polymethyl methacrylate layer $d_S$ $c_{PA}/d_S$ is in the range from 0.2 to 20% by weight/mm, in particular from 0.5 to 10% by weight/mm.

According to one particular aspect of the diffuser sheet of the present invention, the ratio of concentration of the spherical particles (B) $c_{PB}$ to the thickness of the light-scattering polymethyl methacrylate layer $d_S$ $c_{PB}/d_S$ is greater than or equal to 2.5% by weight/mm, in particular greater than or equal to 4% by weight/mm.

The ratio of thickness of the light-scattering polymethyl methacrylate layer $d_S$ to the size of the spherical scattering particles $D_{PA}$ $d_S/D_{PA}$ is preferably in the range from 5 to 1500, in particular from 10 to 1000 and particularly preferably from 100 to 600, with no intended resultant restriction.

The gloss $R_{85°}$ of the light-scattering polymethyl methacrylate layer is preferably smaller than or equal to 60, in particular smaller than or equal to 40 and particularly preferably smaller than 30.

The diffuser sheets of the present invention, in particular the light-scattering polymethyl methacrylate layer, have particularly high scratch resistance. According to one particular aspect of the present invention, scratches produced on the sheet using a force of at most 0.4 N, in particular of at most 0.7 N and particularly preferably of at most 1.0 N are not visually detectable, with no intended resultant restriction.

This scratch resistance may be determined to DIN 53799 and DIN EN 438 by visual assessment of a damaged surface, the damage being brought about by a diamond acting on the surface with varying force.

According to one particular embodiment of the present invention, the average surface roughness $R_Z$ of the sheet is preferably in the range from 5 to 50 μm, in particular from 5 to 25 μm, preferably from 6 to 35 μm and particularly preferably from 6 to 30 μm.

The average surface roughness $R_Z$ may be determined to DIN 4768 using a Talysurf 50 tester from Taylor Hobson, $R_Z$ being the average roughness depth calculated from the averages of the individual roughness depths from five successive individual measurement traverses within the roughness profile.

The surface roughness $R_Z$ of the sheet is generally the result of the selection of the particles (B). This value may moreover be influenced by varying various parameters which are dependent on the nature of the production process.

Among these are the temperature of the melt during the extrusion process, a higher melt temperature giving a rougher surface. However, a factor which has to be considered here is that the temperature of the melt depends on the precise constitution of the moulding composition. The temperature of the melt is generally in the range from 150 to 300° C., preferably in the range from 200 to 290° C. These temperatures are based on the temperatures of the melt on discharge from the die.

The surface roughness may also be affected via the gap between the rollers used to polish the sheets. For example, if a polishing stack encompasses three rollers in an L arrangement, where the moulding composition is conducted from the die into the gap between roller 1 and roller 2 and as a 60-180° wrap around roller 2, the gap between roller 2 and roller 3 polishes the surfaces. If the gap between roller 2 and roller 3 is adjusted to the thickness of the sheet, the scattering particles on the sheet surface are pressed into the matrix, making the surface more polished. To achieve a rougher surface, this gap is generally adjusted to be somewhat larger than the thickness of the sheet to be produced, the relevant value frequently being in the range from 0.1 to 2 mm above the thickness of the sheet, preferably from 0.1 to 1.5 mm above the thickness of the sheet, with no intended resultant restriction. The surface roughness is also affected via the particle size and the thickness of the sheet, the dependencies being shown in the examples.

The light-scattering layer may be produced via known processes, preference being given to thermoplastic shaping processes. Once the particles have been added, light-scattering layers can be produced from the moulding compositions described above via conventional thermoplastic shaping processes.

According to one particular embodiment, a twin-screw extruder is used for the extrusion process or for the production of pellets of moulding compositions comprising scattering beads. In these processes, the plastics particles are preferably converted into the melt in the extruder. By this means it is possible to obtain melts which can give sheets whose transmittance is particularly high.

The diffuser sheets here may be produced via a two-stage process in which the extrusion of the foil or sheet in a single-screw extruder is carried out downstream of an inventive sidefeeder compounding process in a twin-screw extruder and intermediate pelletization. The pellets obtained via the twin-screw extruder may be provided with particularly high proportions of scattering beads, making it simple to produce diffuser sheets with varying content of scattering beads via blending with moulding compositions without scattering beads.

It is also possible to carry out a single-stage process in which the compounding of the spherical plastics particles into the melt takes place as described in a twin-screw extruder which, where appropriate, has a downstream pressure-increasing unit (e.g. melt pump) which is immediately followed by the extrusion die, which extrudes a sheet product. Surprisingly, the means described above can give diffuser sheets with a particularly low yellowness index.

The diffuser sheets may moreover also be produced by injection moulding, in which case, however, the selection of the process parameters or the injection mould is to be such as to give a surface roughness in the inventive range.

The compounding of the matrix with the scattering particles preferably takes place via a twin-screw extruder, and the actual sheet extrusion can also use a single-screw extruder, with no intended resultant restriction.

The transmittance of the diffuser sheet of the present invention is in the range from 30 to 70%, in particular in the range from 40 to 70% and particularly preferably in the range from 40 to 65%.

The yellowness index of the diffuser sheet is preferably smaller than or equal to 12, in particular smaller than or equal to 10, with no intended resultant restriction.

One particular embodiment of the diffuser sheet of the present invention has a halved-intensity angle greater than or equal to 15°, in particular greater than or equal to 25°.

The scattering power of the diffuser sheet of the present invention is greater than or equal to 0.3, in particular greater than or equal to 0.45 and particularly preferably greater than or equal to 0.6.

According to one preferred embodiment, the surface of the inventive diffuser sheets has a matt appearance under reflected light. Gloss measurement using a reflectometer to DIN 67530 may be used for characterization. The gloss of the sheets at an angle of 85° is preferably below 60, particularly preferably below 40 and very particularly preferably below 30.

There is no limit on the size and shape of the diffuser sheets of the present invention. However, the shape of the diffuser sheet is generally that of a rectangular plate because LCDs usually have this type of format.

According to one particular embodiment, the diffuser sheet has particularly high weathering resistance to DIN EN ISO 4892, Part 2—methods of exposure to laboratory light sources: Xenon arc sources.

The inventive diffuser sheets are generally highly resistant to weathering. The weathering resistance to DIN 53387 (Xe-notest) of preferred diffuser sheets is therefore at least 5000 hours.

The modulus of elasticity of the moulding to ISO 527-2 is preferably at least 1500 MPa, in particular at least 2000 MPa, with no intended resultant restriction.

According to one particular aspect of the present invention, preferred diffuser sheets have a long-term service temperature of at least 60° C., in particular at least 70° C. The long-term service temperature is in particular a result of the materials from which the diffuser sheets have been produced. The long-term service temperature indicates the temperature at which, even after a number of hours, the diffuser sheets do not deform.

At the same time, these sheets preferably have a low coefficient of thermal expansion, and therefore undergo longitudinal expansion of at most 0.55%, in particular at most 0.3%, on heating by at least 20° C., in particular at least 40° C.

The inventive diffuser sheets may be used for other optical applications, for example as rear-projection screens.

Examples and comparative examples are used below for more detailed description of the invention, but there is no intention to restrict the invention to these examples.

A) TEST METHODS

Average roughness $R_Z$ was determined to DIN 4768 using Taylor Hobson Talysurf 50 test equipment.

Transmittance $\tau_{D65/2°}$ was determined to DIN 5036 using Perkin Elmer Lambda 19 test equipment.

Yellowness index $\tau_{D65/10°}$ was determined to DIN 6167 using Perkin Elmer Lambda 19 test equipment.

R85° gloss was determined at 85° to DIN 67530 using a laboratory reflectometer from Dr. Lange.

Scattering power and halved-intensity angle were determined to DIN 5036 using a GO-T-1500 LMT goniometer test unit.

B) PREPARATION OF PLASTICS PARTICLES

Plastics Particles B1)

To prepare the spherical plastics particles, use was made of an aluminium hydroxide Pickering stabilizer, prepared by precipitation from aluminium sulphate and soda solution directly prior to starting the actual polymerization. To this end, 16 g of $Al_2(SO_4)_3$, 0.032 g of complexing agent (Trilon A) and 0.16 g of emulsifier (emulsifier K 30 obtainable from Bayer AG; sodium salt of a $C_{15}$ paraffinsulphonate) were first dissolved in 0.8 l of distilled water. A 1N sodium carbonate solution was then added, with stirring and at a temperature of about 40° C., to the aluminium sulphate dissolved in water, the resultant pH being in the range from 5 to 5.5. This procedure gave a colloidal dispersion of the stabilizer in the water.

After the precipitation of the stabilizer, the aqueous phase was transferred to a glass beaker. 110 g of methyl methacrylate, 80 g of benzyl methacrylate, 10 g of allyl methacrylate, 4 g of dilauryl peroxide and 0.4 g of tert-butyl 2-ethylperhexanoate were added into the beaker. This mixture was dispersed by a disperser (UltraTurrax S50N-G45MF, Janke and Kunkel, Staufen) for 15 minutes at 7000 rpm.

Following this exposure to shear, the reaction mixture was charged to the reactor, which had been preheated to the appropriate reaction temperature of 80° C., and polymerized with stirring (600 rpm) at about 80° C. (polymerization temperature) for 45 minutes (polymerization time). A post-reaction phase then followed at about 85° C. internal temperature for 1 hour. After cooling to 45° C., the stabilizer was converted into water-soluble aluminium sulphate by adding 50% strength sulphuric acid. The beads were worked up by filtering the resultant suspension through a commercially available textile filter and drying at 50° C. for 24 hours in a heated cabinet.

The size distribution was studied by laser extinction. The median size $V_{50}$ of the particles was 18.6 μm. The beads had a spherical shape, no fibres being detected. No coagulation occurred. The resultant particles are termed plastics particles B1 below.

Plastics Particles B2)

Plastics particles according to DE 3528165 C2 were prepared, the constitution of the particles being in essence the same as that of the plastics particles B1) described above.

The size distribution was studied by laser extinction. The median size $V_{50}$ of the particles was 40.5 μm. The beads had a spherical shape, no fibres being detected. No coagulation occurred. The resultant particles are termed plastics particles B2 below.

C) EXAMPLES 1 TO 6

Various diffuser sheets were produced by extrusion. To this end, various compounded materials comprising scattering beads and composed of plastics particles B1, plastics particles B2, plastics particles based on styrene with a $V_{50}$ size of about 8.4 µm, obtainable commercially with the trademark ®Techpolymer SBX-8 from Sekisui, and BaSO$_4$ particles whose d50 (Sed.) median size value is about 5 µm, obtainable as P63 barium sulphate VELVOLUX M from Sachtleben, and a PMMA moulding composition obtainable from Röhm GmbH & Co. KG (copolymer of 97% by weight of methyl methacrylate and 3% by weight of methyl acrylate) were first extruded to give plastic sheets. The moulding compositions here comprised 0.05% by weight of Tinuvin P, a UV stabilizer obtainable from Ciba. A BREYER Ø60 mm extruder was used. The temperature of the melt on discharge from the die was generally 270° C. The setting of the polishing stack was generally such as to achieve maximum surface roughness.

Table 1 shows the proportion of particles in the polymethyl methacrylate matrix and the thickness of the sheets.

TABLE 1

|  | Example 1 | Example 2 | Example 3 |
| --- | --- | --- | --- |
| Thickness [mm] | 0.5 | 0.5 | 2 |
| PMMA matrix [parts by weight] | 82 | 82 | 86 |
| ® SBX8 [parts by weight] | 6 | 6 | 4 |
| BaSO$_4$ [parts by weight] | 0 | 0 | 0 |
| Plastics particles B1 [parts by weight] | 0 | 12 | 0 |
| Plastics particles B2 [parts by weight] | 12 | 0 | 10 |

|  | Example 4 | Example 5 | Example 6 |
| --- | --- | --- | --- |
| Thickness [mm] | 2 | 2 | 2 |
| PMMA matrix [parts by weight] | 78 | 87 | 79 |
| ® SBX8 [parts by weight] | 4 | 0 | 0 |
| BaSO$_4$ [parts by weight] | 0 | 3 | 3 |
| Plastics particles B1 [parts by weight] | 0 | 0 | 0 |
| Plastics particles B2 [parts by weight] | 18 | 10 | 18 |

The diffuser sheets obtained were tested in accordance with the test methods described above, the test results obtained being given in Table 2.

TABLE 2

|  | Example 1 | Example 2 | Example 3 |
| --- | --- | --- | --- |
| Transmittance [%] | 73.14 | 71.34 | 52.3 |
| Yellowness index G($\tau_{D65/10°}$) | 4.86 | 5.3 | 6.46 |
| Scattering power σ | 0.56 | 0.6 | 0.87 |
| Halved-intensity angle γ [°] | 43 | 49 | 83.4 |
| $R_Z$ [µm] | 25.4 | 7.6 | 20.2 |
| Gloss R85° | 4.6 | 8.6 | 5.7 |
| $C_{PA} * d_S/D_{PA}^3$ [% by weight * mm/µm³] | 0.00505 | 0.00505 | 0.01347 |
| $C_{PB} * d_S/D_{PB}^3$ [% by weight * mm/µm³] | 0.000090 | 0.00093 | 0.00030 |
| $R_Z^2/D_{PB}^3$ | 0.00968 | 0.00416 | 0.00613 |

|  | Example 4 | Example 5 | Example 6 |
| --- | --- | --- | --- |
| Transmittance [%] | 50.5 | 56.75 | 54.88 |
| Yellowness index G($\tau_{D65/10°}$) | 7.5 | 4.39 | 4.73 |
| Scattering power σ | 0.89 | 0.76 | 0.8 |
| Halved-intensity angle γ [°] | 84 | 77.0 | 78.4 |
| $R_Z$ [µm] | 33.7 | 21.3 | 28.0 |
| Gloss R85° | 0.9 | 8.1 | 2.0 |
| $C_{PA} * d_S/D_{PA}^3$ [% by weight * mm/µm³] | 0.01347 | 0.0480 | 0.0480 |
| $C_{PB} * d_S/D_{PB}^3$ [% by weight * mm/µm³] | 0.000542 | 0.00030 | 0.000542 |
| $R_Z^2/D_{PB}^3$ | 0.017102 | 0.00680 | 0.01184 |

The invention claimed is:

1. A diffuser sheet for LCD applications comprising at least one light-scattering polymethyl methacrylate layer having a thickness in the range from 2 to 5 mm and an average surface roughness $R_Z$ in the range from 5 to 50 µm, wherein the polymethyl methacrylate layer comprises a polymethyl methacrylate matrix and also from 0.5 to 59.5% by weight, based on the weight of the light-scattering polymethyl methacrylate layer, of spherical scattering particles (A) whose median size $V_{50}$ is in the range from 0.1 to 40 µm, and whose refractive index differs from that of the polymethyl methacrylate matrix by a value in the range from 0.02 to 0.2, and from 0.5 to 59.5% by weight, based on the weight of the light-scattering polymethyl methacrylate layer, of spherical particles (B) whose median size $V_{50}$ is in the range from 10 to 150 µm and whose refractive index differs from that of the polymethyl methacrylate matrix by a value in the range from 0 to 0.2, where the total concentration of the spherical scattering particles (A) and particles (B) is in the range from 1 to 60% by weight, based on the weight of the light-scattering polymethyl methacrylate layer;

wherein the median particle size $V_{50}$ of the spherical particles (B) is greater by at least 5 µm than the median particle size $V_{50}$ of the spherical scattering particles (A), wherein the transmittance of the diffuser sheet is in the range from 20 to 70% and its scattering power is greater than 0.3, and wherein the ratio of the square of average surface roughness of the polymethyl methacrylate layer $R_Z$ to the third power of the size of the spherical particles (B) $R_Z^2/D_{PB}^3$ is in the range from 0.0002 to 0.1300 µm$^{-1}$.

2. The diffuser sheet according to claim 1, wherein the ratio of the square of average surface roughness of the polymethyl methacrylate layer $R_Z$ to the third power of the size of the spherical particles (B) $R_Z^2/D_{PB}^3$ is in the range from 0.0009 to 0.0900 µm$^{-1}$.

3. The diffuser sheet according to claim 1, wherein the ratio of concentration of the particles (B) $c_{PB}$ to the thickness of the light-scattering polymethyl methacrylate layer $d_S$ $c_{PB}/d_S$ is greater than or equal to 2.5% by weight/mm.

4. The diffuser sheet according to claim 1, wherein the gloss R85° of the light-scattering polymethyl methacrylate layer is smaller than or equal to 40.

5. The diffuser sheet according to claim 1, wherein the ratio $C_{PA} * d_S/D_{PA}^3$ is in the range from 0.0025 to 0.3% by weight *mm/µm².

6. The diffuser sheet according to claim 1, wherein the ratio $c_{PB} * d_S/D_{PB}^3$ is in the range from 0.00005 to 0.02% by weight *mm/µm².

7. The diffuser sheet according to claim 1, wherein the spherical particles (B) comprise crosslinked polystyrene, polysilicone and/or crosslinked poly(meth)acrylates.

8. The diffuser sheet according to claim 1, wherein the scattering particles (A) comprise $BaSO_4$.

9. The diffuser sheet according to claim 1, wherein the matrix of the light-scattering polymethyl methacrylate layer has a refractive index in the range from 1.46 to 1.54, measured for the sodium D line (589 nm) and at 20° C.

10. The diffuser sheet according to claim 1, wherein the average surface roughness $R_Z$ of the sheet is in the range from 6 to 30 µm.

11. The diffuser sheet according to claim 1, wherein the median size $V_{50}$ of the spherical particle (B) is greater by at least 10 µm than the median size of the scattering particles (A).

12. The diffuser sheet according to claim 1, wherein the median size $V_{50}$ of the spherical scattering particles (A) is in the range from 2 to 15 µm.

13. The diffuser sheet according to claim 1, wherein the median size $V_{50}$ of the spherical particles (B) is in the range from 15 to 70 µm.

14. The diffuser sheet according to claim 1, wherein scratches produced on the sheet using a force of at most 0.7 N are not visually detectable.

15. The diffuser sheet according to claim 1, wherein the long-term service temperature of the sheet is at least 60° C.

16. The diffuser sheet according to claim 1, wherein the modulus of elasticity of the sheet is at least 2000 MPa.

17. The diffuser sheet according to claim 1, wherein the longitudinal expansion of the sheet due to heating by at least 20° C. is at most 5%.

18. The diffuser sheet according to claim 1, wherein the weathering resistance of the sheet to DIN 53 387 is at least 5000 hours.

19. The diffuser sheet according to claim 1, wherein the transmittance of the sheet is in the range from 40 to 65%.

20. The diffuser sheet according to claim 1, wherein the yellowness index of the sheet is smaller than or equal to 12.

21. The diffuser sheet according to claim 1, wherein the halved-intensity angle of the sheet is greater than or equal to 15°.

22. The diffuser sheet according to claim 1, wherein the scattering power of the sheet is greater than or equal to 0.45.

23. An optical device comprising the diffuser sheet according to claim 1.

24. A rear-projection screen comprising the diffuser sheet according to claim 1.

25. The diffuser sheet for LCD applications of claim 1 comprising at least one light-scattering polymethyl methacrylate layer having an average surface roughness $R_Z$ in the range from 5 to 25 µm.

26. The diffuser sheet for LCD applications of claim 1 comprising at least one light-scattering polymethyl methacrylate layer having an average surface roughness $R_Z$ in the range from 6 to 35 µm.

27. A process for producing a diffuser sheet claim 1, comprising extruding a moulding composition comprising polymethyl methacrylate, spherical scattering particles (A) and spherical particles (B) to form the diffuser sheet.

* * * * *